J. E. POINTON.
DOUGH DIVIDING MACHINE.
APPLICATION FILED FEB. 10, 1920.

1,363,614.

Patented Dec. 28, 1920.
2 SHEETS—SHEET 1.

Inventor
J. E. Pointon
By H. R. Kerslake
Attorney

UNITED STATES PATENT OFFICE.

JOHN EDWARD POINTON, OF PETERBOROUGH, ENGLAND.

DOUGH-DIVIDING MACHINE.

1,363,614.      Specification of Letters Patent.      Patented Dec. 28, 1920.

Application filed February 10, 1920. Serial No. 357,753.

*To all whom it may concern:*

Be it known that I, JOHN EDWARD POINTON, a subject of the King of Great Britain and Ireland, residing at Brackley, Park Crescent, Peterborough, in the county of Northants, England, have invented certain new and useful Improvements Relating to Dough-Dividing Machines, of which the following is a specification.

This invention relates to dough dividing machines of the type wherein the dough portions are forced from the main dividing box or its equivalent into a series of sub-dividing boxes or cylinders.

With such machines disadvantages are experienced when the said series comprises several boxes disposed in parallel through difficulties in obtaining regular feeding or complete charging of the main dividing box from the hopper, and a uniform distribution of such charges throughout the series or plurality of cylinders. To obtain accuracy and uniformity in the weights of the divided dough portions regularity of feeding or charging of the main dividing box and uniform distribution of the charge among the subdividing boxes or cylinders are essential.

The object of this invention is to provide simple and convenient means for overcoming the said difficulties and insuring accuracy and uniformity in the division of the dough into portions of the required weight.

The invention comprises the use of a compartmental main dividing box and the combination therewith of a ram and dividing knife for each compartment, the plurality of rams and dividing knives being adapted for operation as a single unit or otherwise.

Referring to the two accompanying sheets of explanatory drawings:—

(Fig. 3), and Fig. 5 a side elevation of the said main dividing box.

The same reference letters in the different views indicate the same or similar parts.

Figure 1:
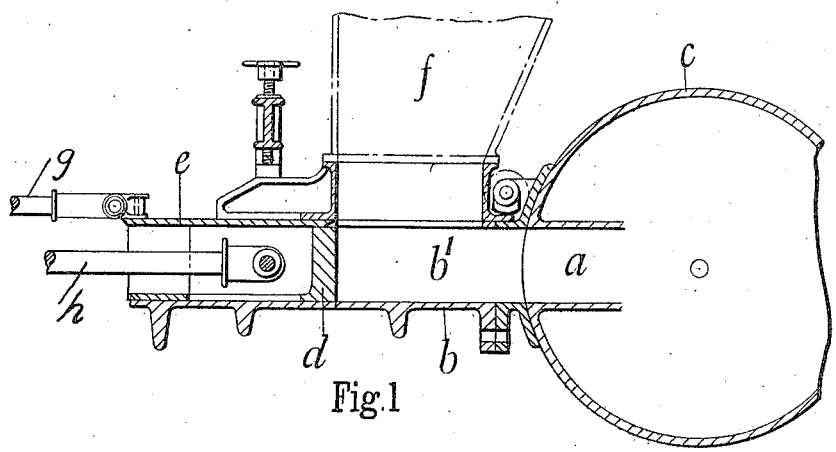
Figure 1 is a sectional side elevation, and Fig. 2 a sectional end elevation representing the main dividing box and associated parts of a dough dividing machine as constructed in accordance with this invention.

In the application of the invention, as illustrated in the drawings, to a dough dividing machine having six sub-division boxes $a$ arranged in alinement, the main dividing box $b$ is of a sufficient width to extend in front of all the said boxes, but is formed into two compartments $b'$, $b^2$ by a central wall or partitioning rib $b^3$ extending throughout its length. Thus each compartment commands or extends in front of three sub-division boxes or cylinders $a$. The said sub-division boxes or cylinders $a$ are, in the example illustrated, formed or arranged in a rotatable cylindrical head or drum $c$ in a known manner forming no part of this invention.

Each of the compartments $b'$. $b^2$ of the main dividing box $b$ has a ram as $d$ (Fig. 1) adapted for reciprocation therein, and with each ram there is provided a knife as $e$, $e'$, for dividing the dough, which descends into the compartments $b$, $b'$ from the hopper $f$ above them, from the mass within the hoppers.

The reciprocation of the knives $e$, $e'$ and the rams as $d$ is effected in any convenient and well known manner, as, for example, through rods as $g$ and $h$ (Fig. 1) to which reciprocatory movements are imparted through cam operated levers or otherwise.

Figure 2:
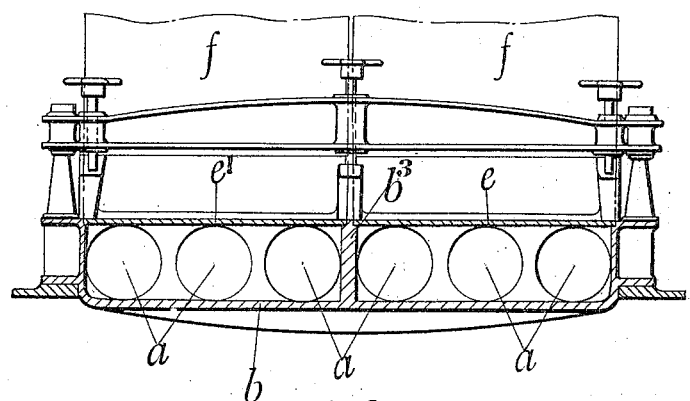
Figure 3:
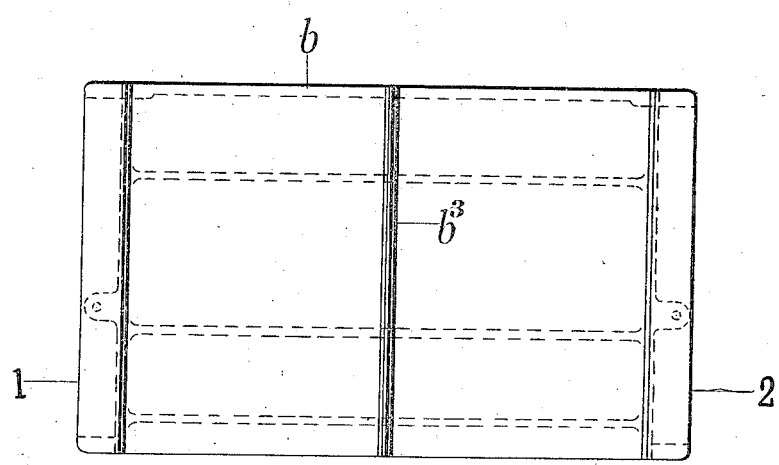
Fig. 3 is a plan, Fig. 4 a section through a line 1. 2.
Figure 4:
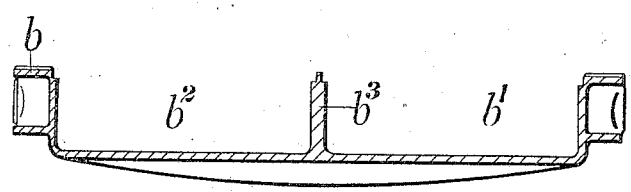
Figure 5:
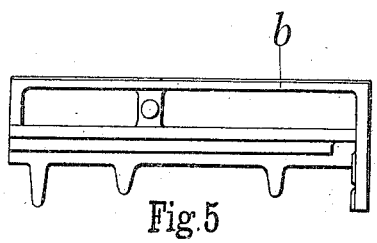

The central wall or partitioning rib $b^3$ aforesaid serves also, as is shown at Fig. 2, to support the inner or adjacent sides of the knives $e$, $e'$ employed in the respective compartments of the main dividing box $b'$, and to enable the same to be very effectually stayed or stiffened against deflection.

The hopper $f$ is also preferably provided with compartments corresponding with those of the main division box $b$.

Having thus described my invention what I claim as new and desire to secure by Letters Patent is:—

In dough dividing machines, the combination with a hopper, a compartmental open top division box beneath said hopper, a reciprocating ram in each compartment of the said division box, and a series of sub-division chambers communicating with each compartment, of reciprocating knives between the open top of said division box and the hopper, and means for stiffening the said knives between the box compartments, as set forth.

In testimony whereof I have signed my name to this specification.

JOHN EDWARD POINTON.